United States Patent
Chun et al.

(10) Patent No.: US 11,019,147 B2
(45) Date of Patent: May 25, 2021

(54) METHOD AND APPARATUS FOR PROCESSING SENSOR INFORMATION

(71) Applicant: Samsung Electronics Co., Ltd., Gyeonggi-do (KR)

(72) Inventors: Jaiick Chun, Gyeonggi-do (KR); Sehoon Kim, Seoul (KR); Junhyung Kim, Gyeonggi-do (KR)

(73) Assignee: Samsung Electronic Co., Ltd

( * ) Notice: Subject to any disclaimer, the term of this patent is extended or adjusted under 35 U.S.C. 154(b) by 164 days.

(21) Appl. No.: 14/989,456

(22) Filed: Jan. 6, 2016

(65) Prior Publication Data

US 2016/0197999 A1 Jul. 7, 2016

(30) Foreign Application Priority Data

Jan. 6, 2015 (KR) .................. 10-2015-0000949

(51) Int. Cl.
*H04L 29/08* (2006.01)
*H04W 4/70* (2018.01)
*G06F 11/30* (2006.01)
*G06F 9/50* (2006.01)

(52) U.S. Cl.
CPC .......... *H04L 67/12* (2013.01); *H04L 67/2804* (2013.01); *H04L 67/2838* (2013.01); *H04W 4/70* (2018.02); *G06F 9/5011* (2013.01); *G06F 11/30* (2013.01)

(58) Field of Classification Search
CPC ............................. G06F 9/5011; H04L 67/12
See application file for complete search history.

(56) References Cited

U.S. PATENT DOCUMENTS

2006/0167634 A1 7/2006 Cho et al.
2010/0198023 A1* 8/2010 Yanai .................. G06Q 10/00
                                                              600/301
2010/0241655 A1 9/2010 Lee et al.
(Continued)

FOREIGN PATENT DOCUMENTS

CN       1889486      1/2007
CN       102196502    9/2011
(Continued)

OTHER PUBLICATIONS

European Search Report dated Nov. 28, 2017 issued in counterpart application No. 16735161.8-1853, 8 pages.
(Continued)

*Primary Examiner* — Barbara B Anyan
(74) *Attorney, Agent, or Firm* — The Farrell Law Firm, P.C.

(57) ABSTRACT

The present disclosure relates to a method and apparatus for determining a representative sensor using sensor data collected from a plurality of sensors and processing the sensor data using sensor data of the determined representative sensor. The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services.

18 Claims, 10 Drawing Sheets

(56) References Cited

U.S. PATENT DOCUMENTS

| | | | |
|---|---|---|---|
| 2011/0285516 A1* | 11/2011 | Ritter | H04W 88/04 340/286.02 |
| 2011/0319750 A1 | 12/2011 | Hara | |
| 2012/0215893 A1* | 8/2012 | Bisdikian | G06F 9/5011 709/223 |
| 2014/0288874 A1* | 9/2014 | Matsunaga | G01P 15/00 702/141 |
| 2014/0296999 A1 | 10/2014 | Kim et al. | |
| 2015/0050902 A1 | 2/2015 | Umeki et al. | |
| 2015/0179038 A1* | 6/2015 | Daniel | B64C 39/024 340/870.07 |
| 2015/0180986 A1* | 6/2015 | Bisdikian | H04L 67/2838 709/204 |
| 2017/0020438 A1* | 1/2017 | Wang | G06F 11/30 |
| 2017/0258338 A1* | 9/2017 | Presura | G16H 50/50 |
| 2017/0289255 A1* | 10/2017 | Urquhart | H04L 43/16 |
| 2017/0293729 A1* | 10/2017 | Movva | A61B 5/7275 |

FOREIGN PATENT DOCUMENTS

| | | |
|---|---|---|
| EP | 1 954 004 | 8/2008 |
| JP | 2007-013983 | 1/2007 |
| JP | 2007-060155 | 3/2007 |
| JP | 2008-059160 | 3/2008 |
| JP | 2012-006512 | 1/2012 |
| JP | 2012-007941 | 1/2012 |
| JP | 2013-191156 | 9/2013 |
| JP | 2014-053729 | 3/2014 |
| KR | 100932911 | 12/2009 |
| KR | 10-0987394 | 10/2010 |
| KR | 101368470 | 2/2014 |
| KR | 1020140117973 | 10/2014 |

OTHER PUBLICATIONS

Chinese Office Action dated Sep. 24, 2019 issued in counterpart application No. 201610007191.3, 22 pages.

JP Notice of Reasons for Refusal dated Nov. 18, 2019 issued in counterpart application No. 2017-535985, 10 pages.

JP Notice of Allowance dated Apr. 27, 2020 issued in counterpart application No. 2017-535985, 6 pages.

Korean Office Action dated Aug. 19, 2020 issued in counterpart application No. 10-2015-0000949, 12 pages.

* cited by examiner

METHOD AND APPARATUS FOR PROCESSING SENSOR INFORMATION

PRIORITY

This application claims priority under 35 U.S.C. § 119(a) to Korean Patent Application Serial No. 10-2015-0000949, which was filed on Jan. 6, 2015, the entire content of which is incorporated herein by reference.

BACKGROUND

1. Field of the Disclosure

The present disclosure relates to a method and apparatus for processing data. More particularly, the present disclosure relates to a method and apparatus for determining a representative sensor using sensor data collected from a plurality of sensors and processing the sensor data using sensor data of the determined representative sensor.

2. Description of the Related Art

The Internet, which is a human centric connectivity network where humans generate and consume information, is now evolving to the Internet of Things (IoT) where distributed entities exchange and process information without human intervention. The Internet of Everything (IoE), which is a combination of IoT technology and Big Data processing technology through connections with a cloud server, has emerged. As technology elements, such as "sensing technology", "wired/wireless communication and network infrastructure", "service interface technology", and "security technology" have been required for IoT implementation, a sensor network, a Machine-to-Machine (M2M) communication, Machine Type Communication (MTC), and so forth have been extensively researched.

An IoT environment may provide intelligent Internet technology services that create additional value to human life by collecting and analyzing data generated among connected things. IoT may be applied to a variety of fields including a smart home, smart building, smart city, smart car or connected cars, smart grid, health care, smart appliances and advanced medical services through convergence and combination between existing Information Technology (IT) and various industrial applications.

Many devices connected to the network may include various sensors in an IoT environment. The information collected by various sensors in the devices may be transferred to the network to be used for services and stored on a server.

In the IoT environment, as the number of devices connected to the network increases, the amount of sensor data provided by the devices increases and the type or content of the sensor data may overlap with each other. Therefore, since the data collected by an identical sensor in the same place at the same time may be redundant information, the power consumption of devices, communication resources, and storage capacity for transmitting the collected sensor data may be wasted due to the redundant transmission and storage of the data.

SUMMARY

According to aspects of the present disclosure a method and apparatus for processing sensor information is provided to solve these and other problems.

In accordance with an aspect of the present disclosure, a method for processing sensor information transmitted by one or more electronic devices is provided. The method includes receiving sensor information from one or more electronic devices, determining, as a representative sensor, any one sensor among one or more sensors provided in the electronic devices on the basis of the received sensor information, and transmitting representative sensor-related information to the one or more electronic devices.

In accordance with another aspect of the present disclosure, a method for transmitting sensor information by an electronic device is provided. The method includes collecting sensor data using at least one sensor provided in the electronic device, transmitting sensor information including the sensor data and sensor-related information on the one or more sensors and the electronic device to the sensor information processing device, and receiving information on the representative sensor determined by the sensor information processing device.

In accordance with another aspect of the present disclosure, there is provided a sensor information processing apparatus for processing sensor information transmitted by one or more electronic devices. The apparatus includes a communication unit that performs data communication, a controller that receives sensor information from the one or more electronic devices and determines a representative sensor from among the one or more sensors provided in the electronic devices on the basis of the received sensor information, and transmits representative sensor-related information to the one or more electronic devices and a storage unit that stores the representative sensor-related information.

In accordance with another aspect of the present disclosure, there is provided an electronic device including a communication unit that performs data communication, at least one sensor unit that collects sensor data, a controller that transmits sensor information including the sensor data and sensor-related information on the one or more sensors and the electronic device to the sensor information processing device, and receives information on the representative sensor determined by the sensor information processing device and a storage unit that stores the sensor information and the representative sensor-related information.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
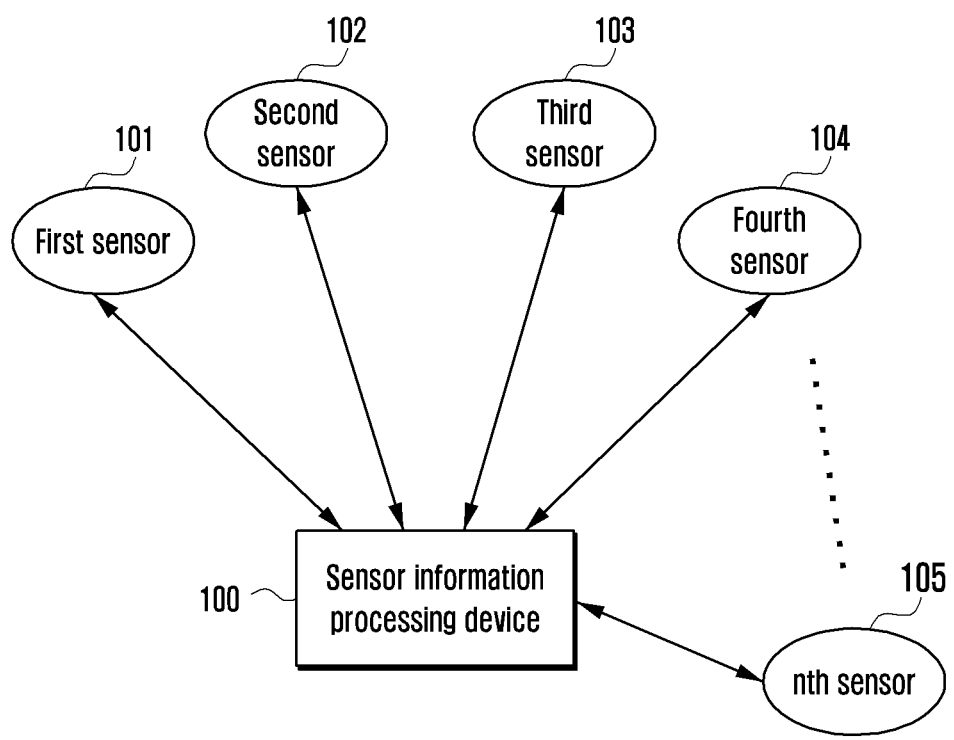
FIG. 1 is a block diagram representing an environment in which a sensor information processing device is operated according to an embodiment of the present disclosure.

Hereinafter, various embodiments of the present disclosure will be described in detail with reference to the accompanying drawings.

In describing the various embodiments of the present disclosure, descriptions related to technical contents which are well-known in the art to which the present disclosure pertains, and are not directly associated with the present disclosure, will be omitted. Such an omission of unnecessary description is intended to prevent obscuring the main idea of the present disclosure and more clearly discloses the main idea.

In the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, and may be implemented in various different forms. The following embodiments are provided only to completely disclose the present disclosure and inform those skilled in the art of the scope of the present disclosure, and the present disclosure is defined only by the scope of the appended claims. Throughout the specification, the same or similar reference numerals designate the same or similar elements.

Each block of the flowchart illustrations and combinations of blocks in the flowchart illustrations may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct or control a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code which includes one or more executable instructions for implementing the specified logical function(s). It should also be noted that in some alternative implementations, the functions noted in the blocks may occur out of the order described in the present disclosure. For example, two blocks shown in succession may in fact be executed substantially concurrently or the blocks may sometimes be executed in the reverse order, depending upon the functionality involved.

As used herein, the terms "unit" or "module" refer to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute on one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented as one or more CPUs within a device or a security multimedia card.

The sensor information processing device of the present disclosure may process sensor information collected from at least one sensor provided in an electronic device within a predetermined range. The electronic device includes at least one sensor and there are no limitations as to the type of sensor. However, in the present disclosure, for convenience of description, the type of sensor is assumed to be one among a temperature sensor, a humidity sensor, an irradiance sensor, a motion sensor, a dust sensor, a smell sensor, and a sound sensor. In the present disclosure, an electronic device may have both sensor and communication functions included therein. For example, the electronic device may include at least one of a smart phone, a tablet personal computer (PCs), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., Head Mounted Display (HMD), electronic glasses, electronic clothes, an electronic bracelet, an electronic necklace, an electronic appcessory, an electronic tattoo, or a smart watch). In addition, the electronic device may be a smart home appliance with a sensor and communication function. For example, the electronic device may include at least one of a television, a Digital Video Disk (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder and an electronic picture frame. In addition, the electronic device may include at least one of various medical appliances (e.g., magnetic resonance angiography (MRA), magnetic resonance imaging (MRI), computed tomography (CT) and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) terminal of a shop.

According to an embodiment of the present disclosure, the electronic devices may include at least one of furniture or a part of a building/structure having a sensor and a communication function, electronic boards, electronic signature receiving devices, projectors, and various measuring equipment (e.g., equipment for water supply, electric supply, gas distribution or radio waves). According to embodiments of the present disclosure, the electronic device may be a combination of one or more of the aforementioned various devices. Further, the electronic device may be a flexible display device. When the sensor provided in the electronic device has a communication function in itself, the terms "sensor" and "electronic device" may be used together in the present disclosure.

According to aspects of the present disclosure, since only data determined by a representative sensor among duplicated sensor data is transmitted to a sensor information processing device, efficient power consumption control may be implemented.

According to aspects of the present disclosure, since only sensor data from a valid representative sensor is stored, memory storage management may be efficiently implemented.

According to an aspect of the present disclosure, information collected by a sensor provided in an electronic device is referred to as sensor data, and the collected sensor data or information associated with an electronic device is referred to sensor-related information. In addition, the electronic device may transmit sensor information including the sensor data and sensor-related information to the sensor information processing device. The sensor data may include temperature data and humidity data and the data may include values recorded according to time. The sensor-related information may include information on a type of the sensor, a position of the sensor, a power type of the sensor, an output of a signal for transmitting the sensor information, etc.

FIG. 1 is a block diagram representing an environment in which a sensor information processing device of the present disclosure is operated.

According to FIG. 1, a sensor information processing device 100 of the present disclosure receives sensor information including sensor data acquired by each sensor from a plurality of sensors (a first sensor 101, a second sensor 102, a third sensor 103, a fourth sensor 104, . . . , and an nth sensor 105) and sensor-related information and may process the received sensor information.

The sensor information processing device 100 may group the sensor data provided in the received sensor information according to the type of sensor, the position of sensor, or a pattern of the sensor data. Further, the sensor information processing device 100 may determine any one sensor from among the plurality of sensors as a representative sensor, and may not receive sensor information from the remaining sensors and only receive sensor information from the representative sensor. That is, the sensor information processing device 100 may transmit a request for the remaining sensors to not transmit the sensor information or not to collect the sensor information.

The criteria for determining the representative sensor can be chosen case by case. The sensor information processing device 100 may select a representative sensor based on the received sensor information. Specifically, the sensor information processing device 100 may determine a representative sensor based on at least one of sensor data and sensor-related information provided in the sensor information. When the representative sensor is determined, the sensor information processing device may transmit a sensor information response as feedback information to the electronic device which has transmitted the sensor information. The plurality of sensors (101, 102, 103, 104 and 105), which have received the sensor information response from the sensor information processing device 100, may not transmit the sensor information to the sensor information processing device 100, or may not collect sensor data depending on the content of the sensor information response, during a predetermined time. On the other hand, the plurality of sensors may not transmit sensor information to the sensor information processing device 100 until a certain condition is satisfied, or may not collect sensor data. As a result of this method there is an increase in efficiency of power resources, communication resources, memory resources, etc. of a plurality of sensors (101, 102, 103, 104 and 105).

Hereinafter, operation of the electronic device including the above-mentioned sensor information processing device 100 and a plurality of sensors (101-105) will be described in more detail.

Figure 2:
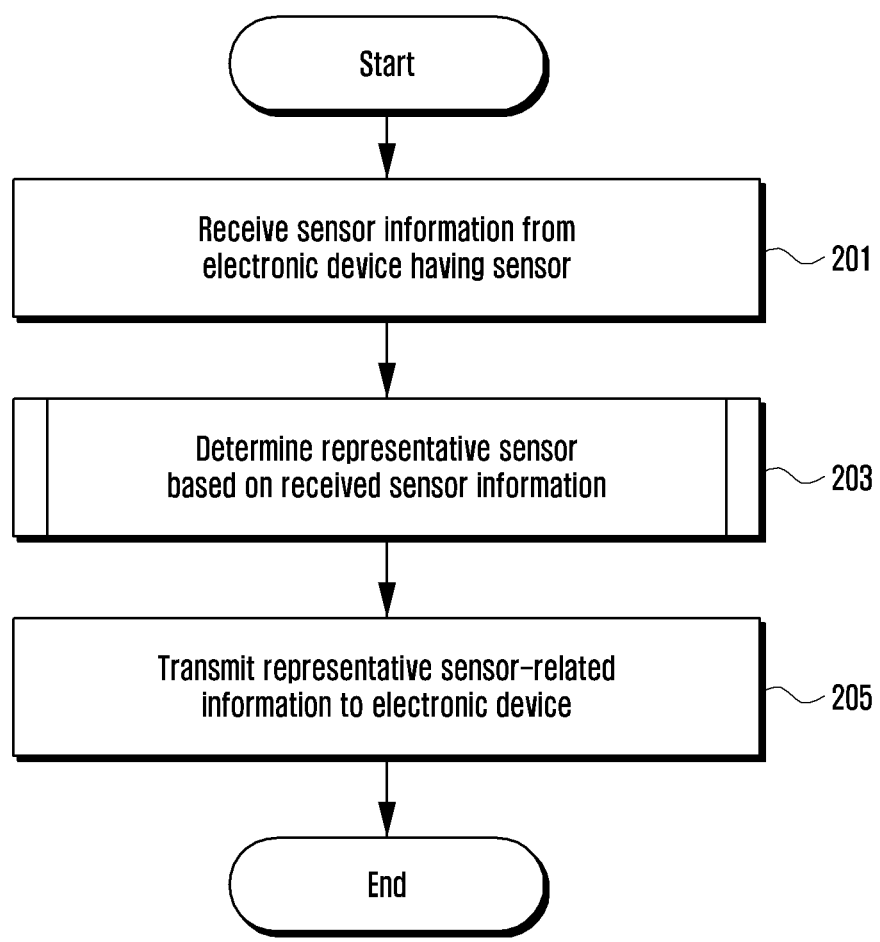
FIG. 2 is a flowchart showing steps of an operation of a sensor information processing device according to an embodiment of the present disclosure.

FIG. 2 is a flowchart showing an operation of a sensor information processing device according to an embodiment of the present disclosure.

According to FIG. 2, the sensor information processing device 100 of the present disclosure receives sensor information from at least one electronic device, in step 201. The electronic device may include at least one sensor. The sensor information may include sensor data collected by at least one sensor provided in the electronic device, and the sensor data may be a values recorded over time. In addition, the sensor information may further include sensor data and sensor-related information, which is information associated with the electronic device. Specifically, the sensor-related information is associated with the sensor data and may include information on the type, position, etc. of the sensor which has collected the sensor data, and is associated with an electronic device, and may include information on a list of sensors or the number of sensors for transmitting the sensor information, a power type of the sensor, an output of a signal for transmitting the sensor information, and a size of a memory for storing the sensor information.

In an embodiment of the present disclosure, a method for receiving sensor information by the sensor information processing device may include a method for requesting an electronic device having a sensor for transmission of the sensor information, and a method for broadcasting the sensor information from the electronic device to neighbor terminals. Specifically, with reference to FIG. 3, a method for receiving sensor information will be described in more detail.

The sensor information processing device determines a representative sensor based on the received sensor information in step 203. The sensor information processing device may group the received sensor information with respect to each sensor of the same type according to sensor-related information. That is, depending on the type of sensors that are included in the sensor-related information, data collected from the same type of sensor may be grouped together. For example, temperature sensor data may be grouped together, and humidity sensor data may be grouped together. In addition, it may be determined whether there is a specific pattern between the sensor data. The sensor data received by the sensor information processing device is the data collected by a sensor in an electronic device which exists in an arbitrary space so that the pattern of change can be determined. Therefore, a specific pattern can be determined through a comparison between the sensor data. The sensor information processing device may determine and manage sensors indicating a specific pattern as a relevant sensor. The sensor information processing device may determine one of the relevant sensors as a representative sensor when the specific pattern is obtained. Specifically, with reference to FIG. 4, a method for determining a representative sensor according to an embodiment of the present disclosure will be described in more detail.

Figure 7:
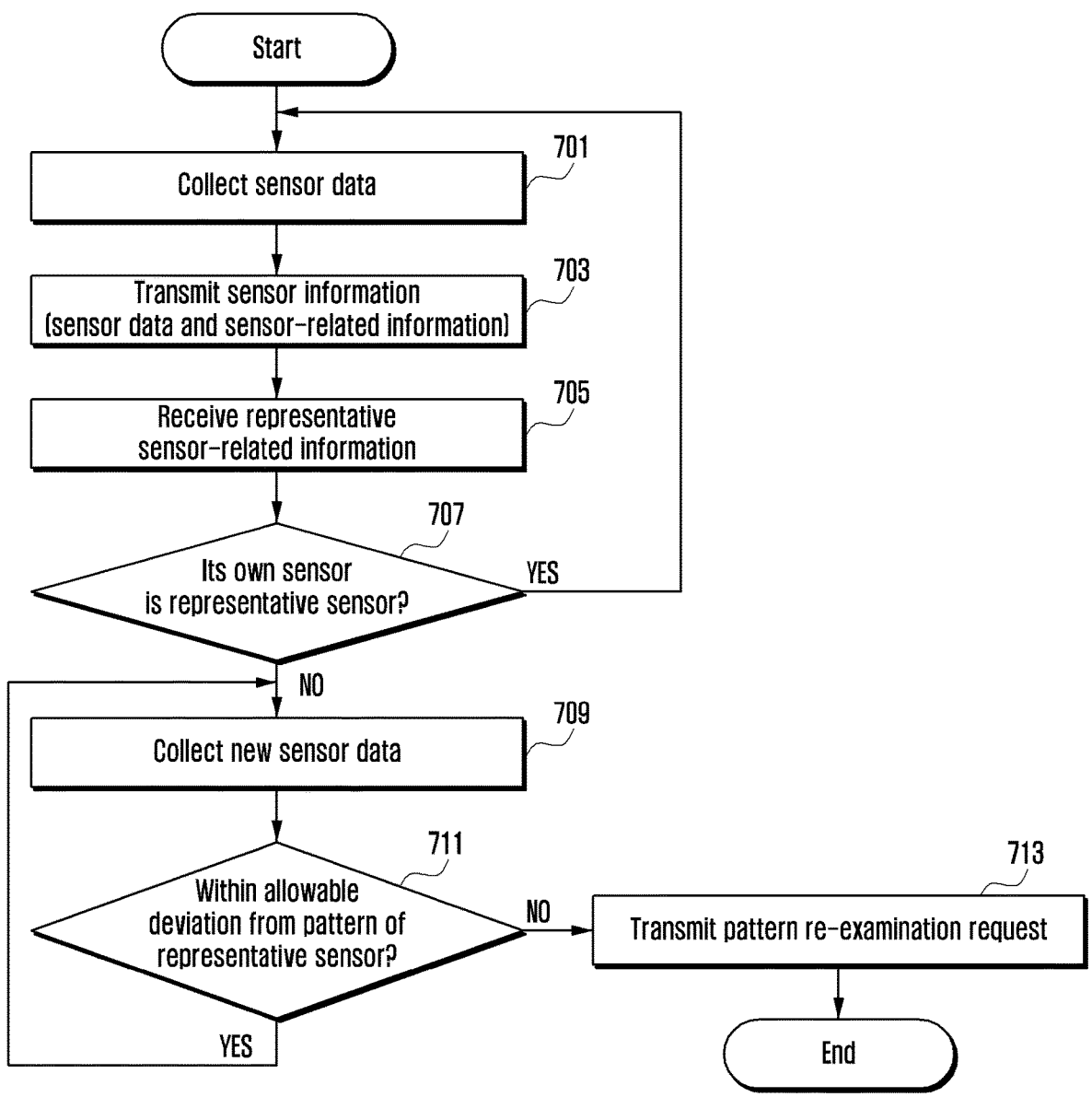
FIG. 7 is a flowchart showing an operation of an electronic device having sensors according to the present disclosure.
Figure 8:
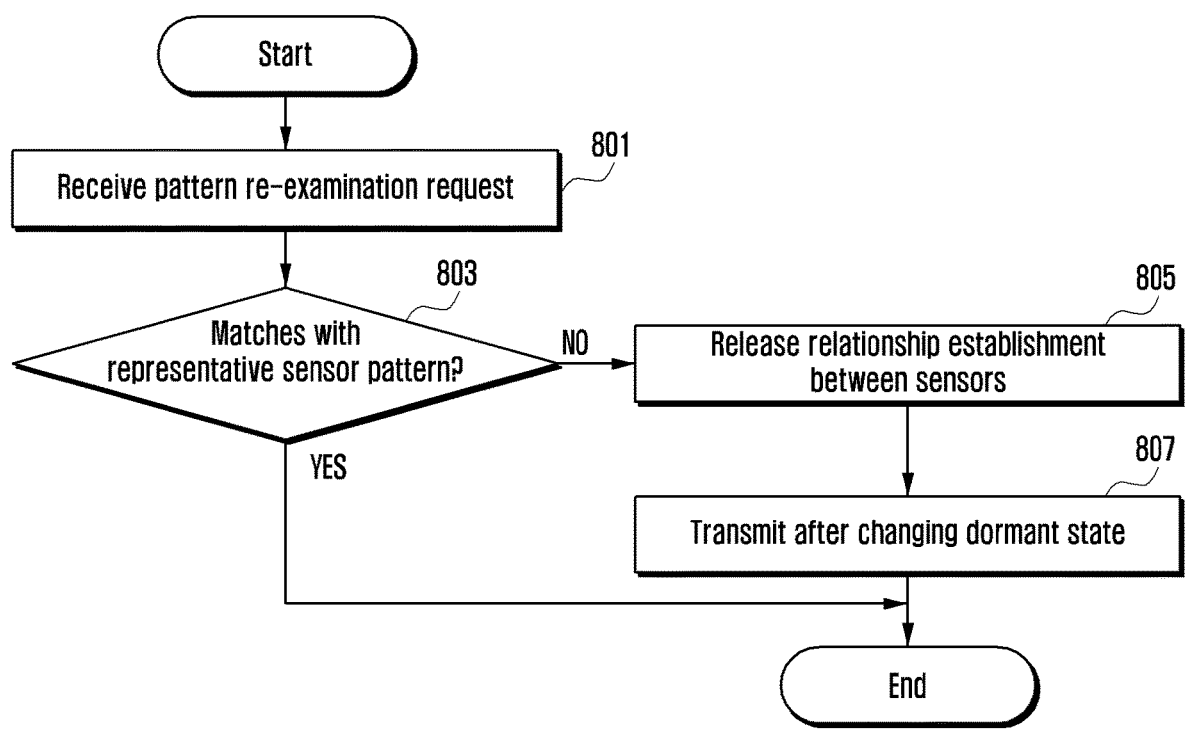
FIG. 8 is a flowchart showing an operation of receiving a request for pattern re-examination by a sensor information processing device according to an embodiment of the present disclosure.

When the representative sensor is determined, the sensor information processing device may transmit the representative sensor-related information to each electronic device in step 205. Representative sensor-related information may include one or more among sensor data or a pattern of the representative sensor, sensor-related information of the representative sensor, and dormant state-related information. The sensor-related information of a representative sensor may be the sensor-related information of the representative sensor received by the sensor information processing device, and the dormant state-related information may be information providing instructions for the remaining sensors excluding the representative sensor. Specifically, the dormant state-related information may include instructions for turning off the sensors other than the representative sensor among relevant sensors, not transmitting the sensor data for a predetermined time, or not transmitting the sensor data until a pattern different from the pattern of the representative sensor is obtained. With reference to FIGS. 7 and 8, and according to an embodiment of the present disclosure, the representative sensor-related information will be described in more detail.

Figure 3:
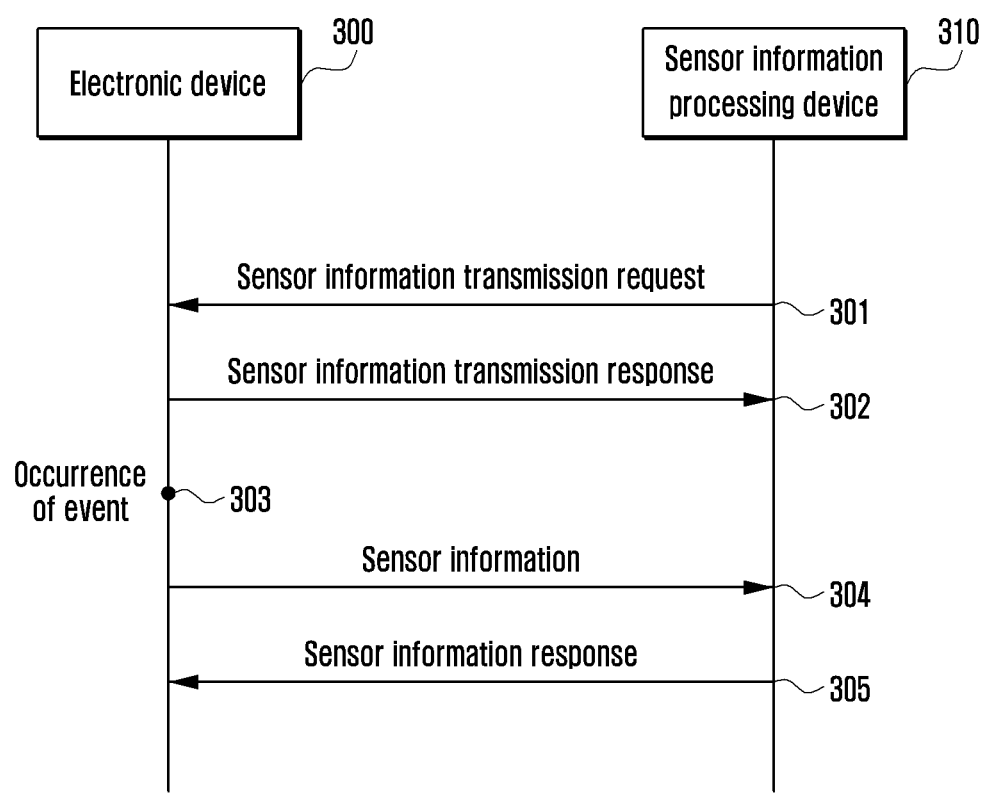
FIG. 3 is a flow diagram illustrating a method for receiving sensor information from an electronic device by a sensor information processing device according to an embodiment the present disclosure.

FIG. 3 is a flowchart illustrating a method for receiving sensor information from an electronic device by a sensor information processing device according to an embodiment of the present disclosure.

The sensor information processing device 310 receives sensor information including sensor data and sensor-related information from the electronic device 300. According to FIG. 3, the sensor information processing device 310 requests transmission of the sensor information to the electronic device 300 (subscription request), in step 301. The sensor information processing device 310 receives the sensor information according to the request of the sensor information processing device 310 rather than continuously receiving the sensor information from the electronic device 300. When it is necessary to determine a representative sensor, the sensor information processing device requests the transmission of the sensor information. The sensor information transmission request transmitted to the electronic device 300 by the sensor information processing device 310 includes an event condition for transmitting sensor information by the electronic device 300. Only when transmitting the sensor information after a predetermined time has elapsed, or when the sensor data exceeds a predetermined size, the sensor information processing device 310 may request the transmission of the sensor information.

The electronic device 300 transmits to the sensor information processing device 310, a sensor information transmission response acknowledgment (ACK) in response to the sensor information transmission request, in step 302.

In step 303, the electronic device collects sensor data from the sensor according to an event. The collection of the sensor data by the sensor of the electronic device may be performed according to the sensor information transmission request 301 of the sensor information processing device 310. That is, the sensor data may be collected immediately after receiving the sensor information transmission request 301, or may be collected after a predetermined time has elapsed. Further, when sensor data values exceeding a critical threshold is detected, sensor data may be collected. The sensor data can be continuously collected according to the predetermined time period, and in step 304, the sensor information is transmitted to the sensor information processing device 310 according to an event of step 303.

The sensor information processing device 310 transmits the sensor information response acknowledgement (ACK) to the electronic device 300, in response to the received sensor information, in step 305.

In FIG. 3, a method is described according to en embodiment of the present disclosure in which the sensor information processing device 310 sends the sensor information transmission request 301 to the electronic device 300 so that the electronic device 300 transmits the sensor information to the sensor information processing device 310. However, this method shows only an example of acquiring sensor information by the sensor information processing device 310 and is not limited to the method described in FIG. 3. The sensor information acquired by the electronic device 300 may be transmitted in a broadcasting method, and if necessary, the sensor information processing device 310 may acquire the sensor information from the broadcasted transmission.

Figure 4:
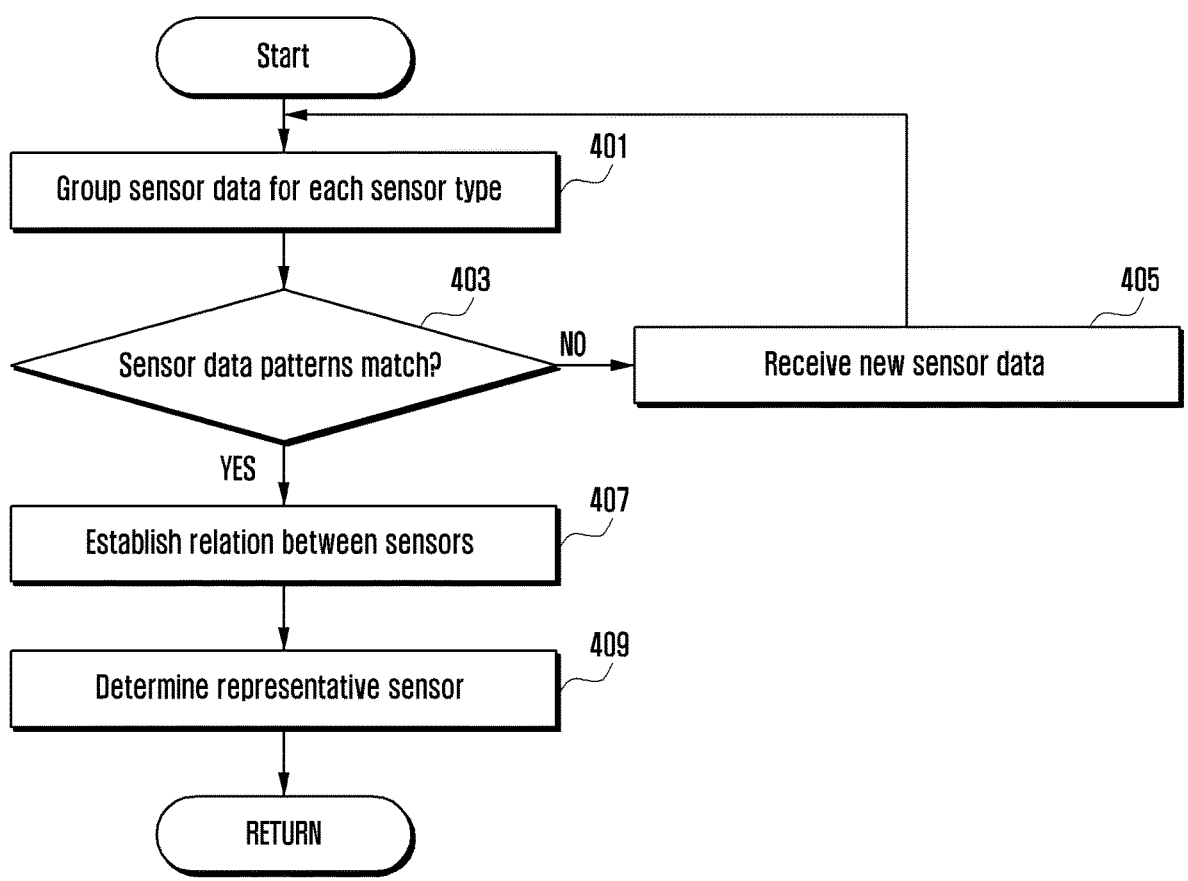
FIG. 4 is a flowchart illustrating a method of determining a representative sensor by a sensor information processing device according to an embodiment of the present disclosure.

FIG. 4 is a flowchart illustrating a method of determining a representative sensor by a sensor information processing device according to an embodiment of the present disclosure.

According to FIG. 4, the sensor information processing device may acquire sensor information transmitted by the method according to FIG. 3, or the method of broadcasting by the electronic device, and determine a representative sensor based on the acquired sensor information. FIG. 4 is a flowchart illustrating the process of step 203 in FIG. 2.

In step 401, the sensor information processing device groups the acquired sensor information according to the type of sensor. Sensor data can be grouped for each sensor of the same type among the sensor information, according to sensor-related information. In addition, the sensor information processing device may group sensor data on the basis of attributes other than the type of sensors. For example, the sensor information processing device may group the sensors according to the type of sensors and place temperature sensor data in a same group, and place humidity sensor data in a same group.

In step 403, the sensor information processing device determines whether data patterns match each other between the sensor data of the grouped sensor information. The sensor data may be temperature data and humidity data, and the data may include a value according to time. Therefore, it can be determined whether there are specific types of patterns by determining whether a data increase/decrease pattern according to time is correlated. In an embodiment of the present disclosure, since the sensor data acquired by the sensor information processing device are those provided in the electronic device, and each electronic device exists in a certain space or range, a similar sensor data pattern may be obtained.

When the pattern of the sensor data are not matched to each other so that a common pattern may not be extracted, the sensor information processing device receives new sensor information in step 405, and groups the newly received sensor data in step 401.

In step 403, when there are patterns of sensor data which match each other, the sensor information processing device establishes a relationship between sensors which have collected sensor data, in step 407. Specifically, the sensor information processing device determines how different each sensor data value is from a representative pattern and establishes a relationship between sensors. If a sensor A is the same sensor as a sensor B and has the same sensor data pattern, the sensor A and the sensor B are classified into and managed as one family sensor. One family sensor may include two or more sensors. When sensors are grouped into and classified as family sensors, information associated with the sensor included in the sensor information may be utilized.

In step 409, the sensor information processing device determines a representative sensor from the relationship between sensors determined in step 407, that is, among the two or more sensors that are classified as the family sensor.

The reference for determining the representative sensor in the present disclosure may be determined by utilizing sensor-related information included in the sensor information of each sensor. The representative sensor may be determined based on the type of power for an electronic device having a corresponding sensor. In a case where there is an electronic device which operates by using a battery and an electronic device which operates by using a wired power, a sensor provided in the electronic device which operates using the wired power is determined as the representative sensor and the battery life of the electronic device which operates by using the battery can be improved.

In an embodiment of the present disclosure, the sensor information processing device may determine a representative sensor based on a list of sensor information transmission requests (such as a subscription request) received by the electronic device from the sensor information processing device in FIG. 3. Since an electronic device having many sensor information transmission requests creates more communication traffic, in terms of efficiency of communication resources, a large communication load concentrated on one electronic device may occur. Therefore, an electronic device having a small list of sensor information transmission requests (subscription request), the sensor having a smaller number of sensor information transmission requests is selected as a representative sensor to achieve efficient operation of the overall communication resources.

In an embodiment of the present disclosure, the sensor information processing device may determine a representative sensor by using the sensor-related information included in the received sensor information. The sensor information processing device may determine a representative sensor depending on the strength of the received signal of an electronic device which has transmitted sensor information. An electronic device having a greater strength of the received signal may be an electronic device which is located nearby or operates at a higher power transmission level, or an electronic device having a high precision of the received sensor information. When a sensor provided in an electronic device having the greater received signal strength of the received sensor information is determined as the representative sensor, more accurate sensor information can be received and greater power efficiency is achieved.

In step 409, when the representative sensor is determined based on the various embodiments, the process proceeds to step 205 in FIG. 2, and the representative sensor-related information may be transmitted to an electronic device which has transmitted the respective sensor information. The representative sensor-related information may include one or more among sensor data or data patterns of the representative sensor, sensor-related information of the representative sensor, dormant state-related information, information for establishing a relationship between sensors, and family sensor information. The sensor-related information of a representative sensor may be the sensor-related information of the representative sensor received by the sensor information processing device, and the dormant state-related information may be information instructing remaining sensors other than the representative sensor. The dormant state-related information may include information on instructions for turning sensors off for a predetermined time, the operation of the sensors other than the representative sensor among relevant sensors or not transmitting the sensor data, or not transmitting the sensor data until a pattern different from the pattern of the representative sensor is obtained.

Figure 5:
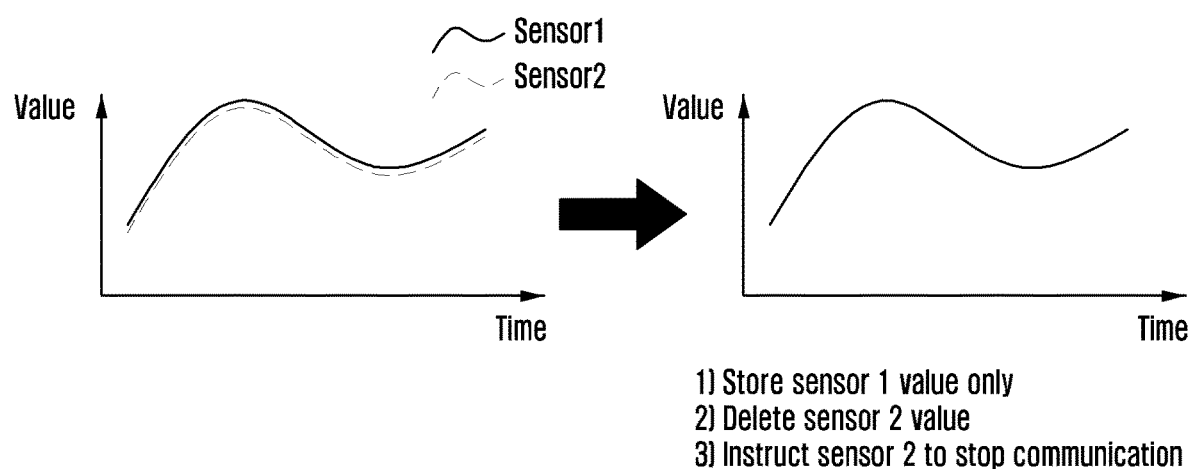
FIG. 5 is a diagram showing an operation of a sensor based on representative sensor-related information after determining a representative sensor, according to an embodiment of the present disclosure.

FIG. 5 is a diagram showing a graph of operation of sensors based on representative sensor related information after determining the representative sensor according to an embodiment of the present disclosure.

According to FIG. 5, sensor data received by a sensor information processing device is a value according to time, which is collected by a sensor 1 and a sensor 2. The sensor 1 and the sensor 2 are the same type of sensor, and both sensors may be associated as a family sensor together. In addition, as shown in the graph of FIG. 5, data collected by each sensor shows a pattern of the same shape. In this case, a representative sensor may be determined according to the various embodiments described in FIG. 4. FIG. 5 shows a case where the sensor 1 is determined as the representative sensor. The sensor information processing device may store a value of the sensor 1 as data of the representative sensor, and delete sensor data transmitted by the sensor 2. In addition, the sensor information processing device transmits the representative sensor-related information of the sensor 1 to the sensor 2 and enables an electronic device having the sensor 2 to stop the transmission of the sensor information.

Figure 6:
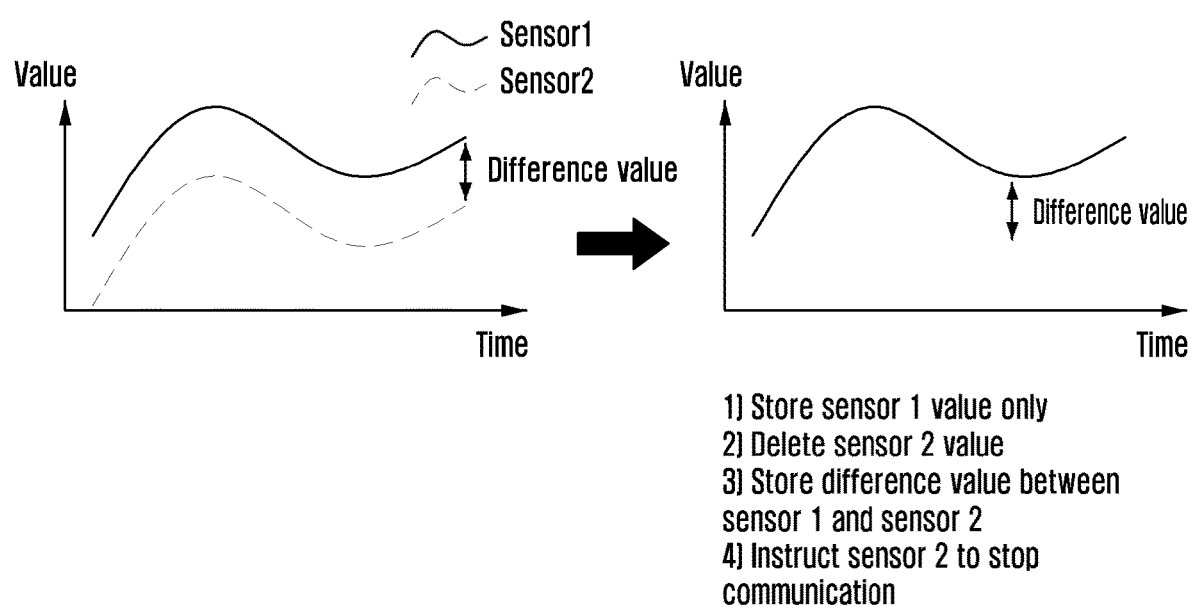
FIG. 6 is a diagram showing an operation of a sensor based on representative sensor-related information after determining a representative sensor, according to another embodiment of the present disclosure.

FIG. 6 is a diagram of a graph showing an operation of each sensor based on representative sensor related information after determining a representative sensor according to another embodiment of the present disclosure.

According to FIG. 6, sensor data received by a sensor information processing device is a value according to time, which is collected by a sensor 1 and a sensor 2. As shown in FIG. 6, the sensor 1 and the sensor 2 are the same type of sensor, and both sensors may be associated as a family sensor together. In addition, as shown in a graph of FIG. 6, data collected by each sensor shows a pattern of the same shape. However, comparing the difference between graphs of FIG. 5 and FIG. 6, in FIG. 5, data of two sensors have substantially the same value, and in FIG. 6, the pattern of the sensors is the same as but a difference between the sensor values is maintained over time. In this case, as shown in FIG. 5, the sensor information processing device needs to store a value of the sensor 2 rather than simply deleting the value of the sensor 2 and transmitting representative sensor-related information for stopping the transmission of the sensor information to the sensor 2. However, for effective use of memory space, since the value of the sensor 2 indicates the same pattern as the value of the sensor 1 of a representative sensor, the sensor information processing device can be utilized to store only the difference in the data values of the sensor 1 and sensor 2, and enable the sensor 2 to transmit the representative sensor-related information of the sensor 1. The transmission of data of the representative sensor is to transmit data of the representative sensor which is different from data of the sensor 2, rather than transmitting a full amount data of the representative sensor. In this case, the sensor 2 may receive only the value of the difference of the data of the representative sensor and calculate the data of the sensor 1. The sensor information processing device may store the value of the sensor 1 as data of the representative sensor, and delete the sensor data transmitted by the sensor 2. Further, the sensor information processing device may store the value of the difference between data of the sensor 1 and sensor 2 and transmit the value to the sensor 2, and enables an electronic device having the sensor 2 to stop the transmission of the sensor information.

FIGS. 5 and 6 described above can be applied to a case of determining a representative sensor by the sensor information processing device and transmitting representative sensor-related information thereof to each electronic device. In addition, the process described in FIGS. 5 and 6 may be selectively performed by the sensor information processing device. When the difference value is smaller than a threshold value, the difference value may not be stored as in FIG. 5, and when the difference value is equal to or greater than the threshold value, the difference may be stored or transmitted.

FIG. 7 is a flowchart showing an operation of an electronic device having sensors according to an embodiment of the present disclosure.

According to FIG. 7, a sensor provided in the electronic device collects sensor data, in step 701. Depending on the type of sensor, examples of electronic devices having corresponding sensors are as follows:

TABLE 1

| Sensor | Electronic device |
|---|---|
| Temperature | Air conditioner, Temperature controller, Boiler, Refrigerator, Kimchi refrigerator, Oven, Air cleaner, Fire alarm, Gas range, etc. |
| Humidity | Air conditioner, Temperature controller, Humidifier, Air cleaner, Refrigerator, Kimchi refrigerator, Dishwasher, etc. |
| Illuminance | Light switch, IP camera, etc. |
| Moving object | Air conditioner, IP camera, Intrusion detector, Door lock, Game machine, etc. |
| Dust | Air conditioner, Air cleaner, Vacuum cleaner, etc. |
| Smell | Air cleaner, Fire alarm, gas leak alarm, etc. |
| Sound | Audio, IP camera, etc. |

Each sensor may collect sensor data according to sensor types such as temperature, humidity, or illuminance. Sensor data collected by sensors may be a value according to time.

The electronic device transmits sensor information including the collected sensor data and sensor-related information to the sensor information processing device, in step 703. This may be a case of receiving a message requesting sensor information transmission (such as a subscription request) in advance from the sensor information processing device, and the corresponding sensor information transmission request may be managed in a list for each sensor. The sensor data may be data itself measured or collected by each sensor. The sensor-related information may include information on a type of the sensor, a position of the sensor, a power type of the sensor, an output of a signal for transmitting the sensor information, or a sensor information request list (subscription request list) of a sensor, etc.

The sensor information processing device may determine a representative sensor based on the received sensor information and transmit representative sensor-related information to each electronic device. The electronic device receives the representative sensor-related information from the sensor information processing device, in step 705. The representative sensor-related information may include one or more among sensor data or a pattern of the representative sensor, sensor-related information of the representative sensor, dormant state-related information, information for establishing relationship between sensors, and family sensor information.

The electronic device determines whether the sensor provided in the electronic device itself is the representative sensor, based on the representative sensor-related information received in step 707. As a result of the determination, when the sensor provided in the electronic device itself is the representative sensor, steps 701 to 705 are repeated.

As a result of step 707, when the sensor provided in the electronic device is not a representative sensor, new sensor data is collected in step 709, and it is determined whether the new sensor data is within an allowable deviation from the data pattern of the representative sensor in step 711. As a result of the determination, when the new data is within the allowable deviation from the data pattern of the representative sensor, it is not necessary to again determine the representative sensor, and thus steps 709 to 711 are repeated.

As a result of the determination in step 711, when new sensor data exceeding the allowable deviation from the data pattern of the representative sensor is collected, it is necessary for the sensor information processing device to again determine the representative sensor and thus a request for re-examining the pattern is transmitted in step 713.

FIG. 8 is a flowchart showing an operation when a sensor information processing device receives a request for pattern re-examination according to the present disclosure.

According to FIG. 8, the sensor information processing device receives a pattern re-examination request from an electronic device having a sensor which has collected new sensor data which exceeds an allowable deviation from the data pattern of the representative sensor, in step 801. The sensor information processing device in FIG. 8 assumes that it has received sensor information from each electronic device in advance, determines a representative sensor based on the received sensor information, and then transmits the determined representative sensor-related information to each electronic device.

The sensor information processing device compares sensor data transmitted by the electronic device and data of the representative sensor stored in advance and then determines whether the pattern matches each other, in step 803. As a result of the determination, when the sensor data transmitted by the electronic device still matches the pattern of the representative sensor, there is no need to again determine a representative sensor and thus no action is required.

However, as a result of the determination in step 803, when the sensor data transmitted by the electronic device does not match the data pattern of the representative sensor, the data of the representative sensor may not represent data of the remaining sensors any longer. Therefore, the sensor information processing device may release the relationship between the sensors, in step 805. Since it is difficult to determine that corresponding sensors are in a family sensor relationship, the relationships between the sensors may be released. In addition, since the representative sensor is required to be again determined, it is necessary to change dormant state configuration information included in the representative sensor-related information which is transmitted to each electronic device in advance. Since the sensor information collected by sensors provided in respective electronic devices is required to be received again and the representative sensor is determined based on the received new sensor information, it is possible to change and transmit the dormant state configuration information included in the representative sensor-related information which had been previously transmitted to the electronic device, in step 807. The changed dormant state configuration information may be transmitted together with the sensor information transmission request (Subscription Request) in FIG. 3.

The dormant state-related information may include information on turning off the operation of the sensors rather than the representative sensor among relevant sensors or not transmitting the sensor data for a predetermined time, or not transmitting the sensor data until a pattern different from the pattern of the representative sensor is obtained. Therefore, the dormant state-related information included in representative sensor information may be transmitted by turning on the dormant state, and in the case of FIG. 8, the dormant state-related information can be transmitted by turning off the dormant state.

An electronic device which has received the changed dormant state may switch off the dormant state of the corresponding sensor, collect sensor data again, and re-transmit the sensor information including the corresponding sensor data to the sensor information processing device.

Figure 9:
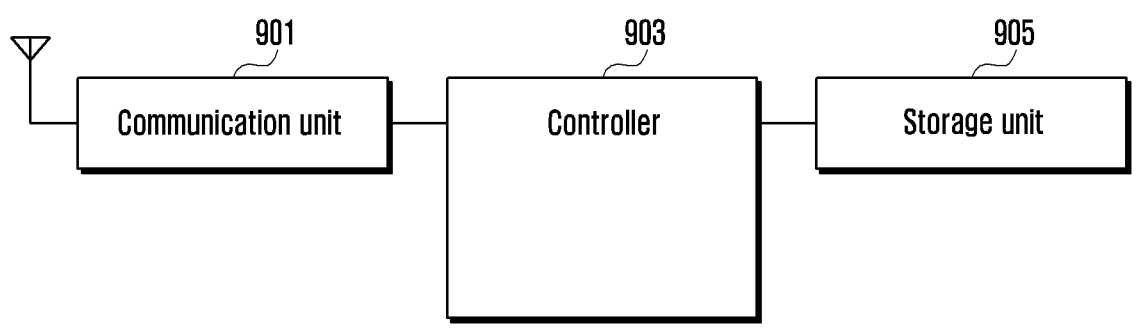
FIG. 9 is a block diagram showing a configuration of a sensor information processing device according to an embodiment of the present disclosure.

FIG. 9 is a block diagram showing a configuration of a sensor information processing device according to an embodiment of the present disclosure.

According to FIG. 9, a sensor information processing device of the present disclosure includes a communication unit 901, a controller 903, and a storage unit 905.

In FIG. 9, the communication unit 901, the controller 903, and the storage unit 905 only are shown, but various modules for performing various functions other than the controller 903 may be provided. However, in this specification, for convenience, the controller 903 is described as performing all functions.

The communication unit 901 performs data communication of the sensor information processing device.

The controller 903 receives sensor information from the one or more electronic devices, determine, as a representative sensor, any one sensor among the one or more sensors provided in the electronic devices based on the received sensor information, and transmit the representative sensor-related information to the one or more electronic devices.

The storage unit 905 stores representative sensor-related information.

In an embodiment of the present disclosure, the sensor information includes sensor data collected by one or more sensors and sensor-related information on the sensor and the electronic device, and the sensor-related information may include information on at least one among the type and the position of the sensor, a list of sensors for transmitting sensor information, a power type of the sensor, a strength of a signal for transmitting the sensor information, and a size of a memory for storing the sensor information.

The representative sensor-related information may include any one among sensor data or a data pattern of the determined representative sensor, sensor-related information of the representative sensor, dormant state-related information, information on relation between sensors, and family sensor information.

The controller 903 may transmit a sensor information transmission request to the electronic device and receive the sensor information transmitted by the electronic device. In addition, the controller 903 may group sensor data which is included in the sensor information and collected by one or more sensors, according to the type of sensor and decide whether patterns of grouped sensor data match each other. As a result of the decision, sensors having data patterns matched to each other as a family sensor, the controller 903 determines a representative sensor based on the sensor-related information of the family sensor. In addition, the controller 903 may determine a sensor provided in an electronic device operated by a wired power among family sensors as a representative sensor, determine a sensor having the smallest number of sensors for transmitting the sensor information among the family sensors as the representative sensor, or determine a sensor having the greatest received signal strength among the family sensors as the representative sensor.

Figure 10:
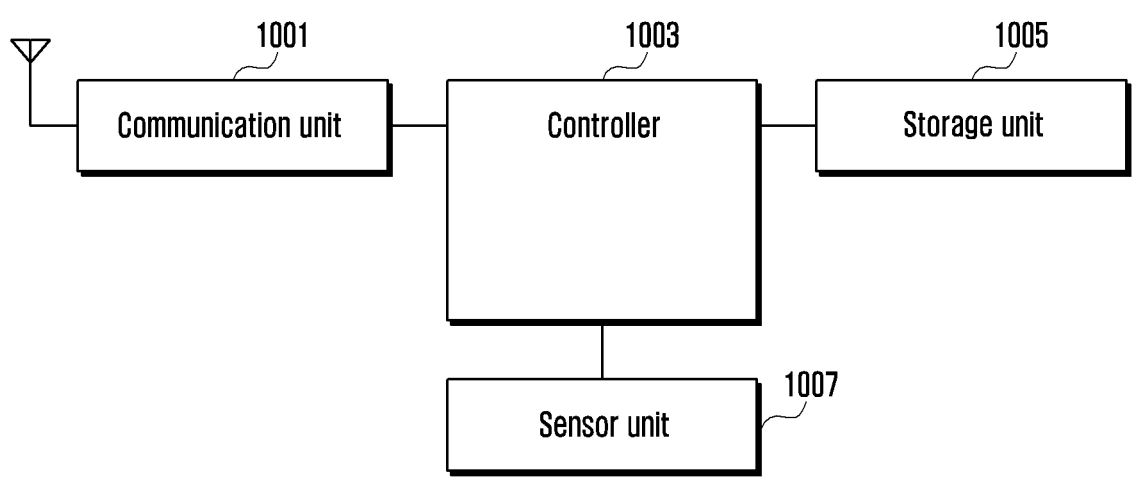
FIG. 10 is a block diagram showing a configuration of an electronic device according to an embodiment of the present disclosure.

FIG. 10 is a block diagram showing a configuration of an electronic device according to an embodiment of the present disclosure.

According to FIG. 10, an electronic device of the present disclosure includes a communication unit 1001, a controller 1003, a storage unit 1005, and a sensor unit 1007.

In FIG. 10, the communication unit 1001, the controller 1003, the storage unit 1005, and the sensor unit 1007 are only shown, but various modules for performing various functions other than the controller 1003 may be provided. However, in this specification, for convenience, the controller 1003 is described as performing all functions.

The communication unit 1001 performs data communication.

The sensor unit 1007 collects sensor data.

The storage unit 1005 stores sensor information and information on the representative sensor.

The controller 1003 transmits sensor information including sensor data and sensor-related information on one or more sensors and an electronic device to the sensor information processing device, and receives information on the representative sensor determined by the sensor information processing device.

In an embodiment of the present disclosure, the sensor-related information may include a list of sensors for transmitting a type of the sensor, a position of the sensor, and sensor information, a power type of the sensor, a strength of a signal for transmitting sensor information, or a size of a memory for storing the sensor information. In addition, the representative sensor-related information may include any one among sensor data or a pattern of the determined representative sensor, sensor-related information of the representative sensor, dormant state-related information, information on relation between sensors, and family sensor information.

In addition, the control unit 1003 may further determine whether at least one sensor is a representative sensor, and as a result of the determination, when the sensor is not the representative sensor, transmit the sensor information after a pre-configured time has elapsed, or transmit sensor information when sensor data exceeds an allowable deviation from a data pattern of the representative sensor.

In the above embodiments, all operations may be optionally performed or may be omitted. Further, steps in each embodiment do not have to be sequentially performed and orders of operation thereof may be changed. The particular embodiments disclosed in the specification and drawings are merely presented to describe technical content of the present disclosure and help the understanding of the present disclosure and are not intended to limit the scope of the present disclosure. It is obvious to those skilled in the art to which the present disclosure belongs that different modifications can be achieved based on the technical spirit of the present disclosure. Therefore, the scope of the present disclosure should not be defined as being limited to the embodiments, but should be defined by the appended claims and equivalents thereof.

What is claimed is:

1. A method for processing sensor information transmitted by one or more electronic devices, comprising:
   receiving sensor information, including sensor data collected from one or more sensors, from the one or more electronic devices;
   grouping the one or more sensors into one or more groups based on a type of a sensor and a data pattern of a sensor data of the sensor, the data pattern including a pattern of a change of the sensor data;
   determining a representative sensor of each group based on the received sensor information;
   transmitting representative sensor-related information to the one or more electronic devices, the representative sensor-related information includes an indication of the determined representative sensor and a request for remaining sensors other than the representative sensor to stop transmitting the sensor information; and
   receiving the sensor data from an electronic device including the determined representative sensor, after transmitting of the representative sensor-related information.

2. The method of claim 1,
   wherein the sensor information further comprises sensor-related information on the sensor and the electronic device, and
   wherein the sensor-related information comprises information on at least one of the type of the sensor, a position of the sensor, a list of the sensors for transmitting the sensor information, a power type of the sensor, a strength of a signal for transmitting the sensor information, and a size of a memory for storing the sensor information.

3. The method of claim 1, wherein the representative sensor-related information comprises at least one of sensor data, a data pattern of the determined representative sensor, sensor-related information of the representative sensor, dormant state relevant information, relationship information between sensors, and family sensor information.

4. The method of claim 1, wherein receiving the sensor information comprises:
   transmitting a request for sensor information to the electronic device; and
   receiving the sensor information transmitted by the electronic device.

5. The method of claim 1, wherein determining the representative sensor comprises determining the representative sensor from among a sensor provided in an electronic device which operates by wired power among the family sensor, a sensor having the smallest number of sensors for transmitting the sensor information, and a sensor having the largest reception signal strength of the sensor information.

6. A method for transmitting sensor information by an electronic device, comprising:
   collecting sensor data from one or more sensors in the electronic device;
   transmitting sensor information including the sensor data and sensor-related information of the one or more sensors and the electronic device to a sensor information processing device, the sensor-related information including a type of the one or more sensors;
   receiving representative sensor-related information associated with a representative sensor of a group as determined by the sensor information processing device, wherein the group is determined based on a type of a sensor and a data pattern of a sensor data of the sensor, the data pattern including a pattern of a change of the sensor data;
   transmitting the sensor data of a sensor which is determined as the representative sensor to the sensor information processing device, in response to receiving the representative sensor-related information, and
   stopping collecting or transmitting of the sensor data of a sensor which is not determined as the representative sensor.

7. The method of claim 6, wherein the sensor-related information comprises information on at least one of the type of the sensor, a position of the sensor, a list of the sensors for transmitting sensor information, a power type of the sensor, a strength of a signal for transmitting sensor information, and a size of a memory for storing the sensor information.

8. The method of claim 6, wherein information associated with the representative sensor comprises at least one of sensor data, a pattern of the determined representative sensor data, sensor-related information of the representative sensor, dormant state relevant information, relationship information between sensors, and family sensor information.

9. The method of claim 6, further comprising determining whether at least one sensor is a representative sensor, and
   as a result of the determination, when the sensor is not a representative sensor, transmitting the sensor information after a preconfigured time has elapsed or when the sensor data exceeds an allowable deviation from a sensor data pattern of the representative sensor.

10. A sensor information processing apparatus for processing sensor information transmitted by one or more electronic devices, comprising:
    a communication unit that performs data communication;
    a controller that configured to:
    receive, using the communication unit, sensor information including sensor data from one or more sensors, from the one or more electronic devices,
    group the one or more sensors into one or more group based on a type of a sensor and a data pattern of a sensor data of the sensor, the data pattern including a pattern of a change of the sensor data;
    determine a representative sensor of each group on the basis of the received sensor information,
    transmit, using the communication unit, representative sensor-related information to the one or more electronic devices, the representative sensor-related information includes an indication of the determined representative sensor and a request for remaining sensors other than the representative sensor to stop transmitting the sensor information, and
    receive, using the communication unit, the sensor data from an electronic device including the determined representative sensor, after transmitting of the representative sensor-related information; and a storage unit that stores the representative sensor-related information.

11. The apparatus of claim 10, wherein the sensor information further comprises sensor-related information on the sensor and the electronic device, and
wherein the sensor-related information comprises information on at least one of the type of the sensor, a position of the sensor, a list of the sensors for transmitting the sensor information, a power type of the sensor, a strength of a signal for transmitting sensor information, and a size of a memory for storing the sensor information.

12. The apparatus of claim 10, wherein the representative sensor-related information comprises at least one among sensor data, a pattern of the determined representative sensor data, sensor-related information of the representative sensor, dormant state relevant information, relationship information between sensors, and family sensor information.

13. The apparatus of claim 10, wherein the controller transmits a request for sensor information to the electronic device, and receives the sensor information transmitted by the electronic device.

14. The apparatus of claim 10, wherein the controller determines, as the representative sensor, one of a sensor provided in an electronic device which operates by wired power among the family sensor, a sensor having the smallest number of sensors for transmitting the sensor information, and a sensor having the greatest reception signal strength of the sensor information.

15. An electronic device comprising:
a communication unit that performs data communication;
at least one sensor unit that collects sensor data;
a controller configured to:
transmit sensor information including the sensor data and sensor-related information of the one or more sensors and the electronic device to the sensor information processing device, the sensor-related information including a type of the one or more sensors,
receive representative sensor-related information associated with a representative sensor of a group as determined by the sensor information processing device, wherein the group is determined based on the type of a sensor and a data pattern of a sensor data of the sensor, the data pattern including a pattern of a change of the sensor data,
transmit the sensor data of a sensor which is determined as the representative sensor to the sensor information processing device, in response to receiving the representative sensor-related information, and
stop collecting or transmitting of the sensor data of a sensor which is not determined as the representative sensor; and
a storage unit that stores the sensor information and the information on the representative sensor.

16. The electronic device of claim 15, wherein the sensor-related information comprises the type of the sensor, a position of the sensor, a list of the sensors for transmitting the sensor information, a power type of the sensor, a strength of a signal for transmitting sensor information, or a size of a memory for storing the sensor information.

17. The electronic device of claim 15, wherein the information on the representative sensor comprises at least one of sensor data, a pattern of the determined representative sensor data, sensor-related information of the representative sensor, dormant state relevant information, relationship information between sensors, and family sensor information.

18. The electronic device of claim 15, wherein the controller further determines whether at least one sensor is a representative sensor, and
as a result of the determination, when the sensor is not a representative sensor, transmitting the sensor information after a preconfigured time has elapsed or when the sensor data exceeds an allowable deviation from a sensor data pattern of the representative sensor.

* * * * *